United States Patent [19]

Kennel

[11] 4,171,676
[45] Oct. 23, 1979

[54] LOW PRESSURE, TREAD WEAR AND SPEED INDICATOR FOR VEHICLE TIRE

[76] Inventor: Richard Kennel, 34-10 43rd St., Long Island City, N.Y. 11101

[21] Appl. No.: 835,124

[22] Filed: Sep. 21, 1977

[51] Int. Cl.$^2$ .............................................. B60C 23/02
[52] U.S. Cl. .............................. 116/34 R; 152/330 A
[58] Field of Search ............... 116/34 R, 34 A, 34 B, 116/74; 152/330 R, 330 A, 353 R, 353 C

[56] References Cited

U.S. PATENT DOCUMENTS

| | | | |
|---|---|---|---|
| 565,451 | 8/1896 | Gregory | 116/34 R X |
| 1,228,204 | 5/1917 | Getman | 116/34 B |
| 1,505,784 | 8/1924 | Heerwagen | 116/34 B |
| 1,764,076 | 6/1930 | Hayes | 116/34 B |
| 1,870,742 | 8/1932 | Pierce | 116/34 A |
| 2,227,074 | 12/1940 | Erickson | 116/34 A |
| 2,268,312 | 12/1941 | Stanton | 116/34 A |
| 2,800,098 | 7/1957 | Crosby, Jr. | 152/353 R X |
| 3,990,491 | 11/1976 | Hampshire et al. | 152/158 |

FOREIGN PATENT DOCUMENTS

| | | | |
|---|---|---|---|
| 2625320 | 12/1976 | Fed. Rep. of Germany | 116/34 A |
| 1196581 | 11/1959 | France | 116/34 R X |
| 2342859 | 9/1977 | France | 116/114 Q |

*Primary Examiner*—Daniel M. Yasich
*Attorney, Agent, or Firm*—Allison C. Collard; Thomas M. Galgano

[57] ABSTRACT

A low pressure, tread wear and speed indicator for a tire includes at least one abutment member secured to the exterior surface of one of the sidewalls of the tire adjacent to the tread, which projects laterally outward from the sidewall. The abutment member is positioned at a distance radially inwardly from the tread such that, upon tire deflation or excessive tread wear or a combination thereof, the abutment will strike the road surface during vehicle operation, to produce a vibrational and/or audible signal perceivable by the driver, indicating an unsafe tire condition. The indicator may also include a weighted insert embedded within the abutment member which, upon operation of the vehicle at an excessive or illegal rate of speed, will produce an eccentric tire condition which, in turn, causes a vibrational signal. A tire deflation indicator which includes a segmented radially-extending rib formed on the interior surface of the tire sidewall is also provided.

3 Claims, 12 Drawing Figures

LOW PRESSURE, TREAD WEAR AND SPEED INDICATOR FOR VEHICLE TIRE

This invention relates to a low pressure, tread wear, and speed indicator for tires. More specifically, it relates to a low pressure and tread wear indicator for tires, which is secured to the sidewall of the tire and which, when an unsafe condition of tire underinflation or excessive tread wear exists, will strike the road during vehicle operation, to produce a signal readily perceivable to the driver, indicating an unsafe tire condition. In addition, it particularly relates to such a device which includes a weighted insert embedded in the abutment which will produce an eccentric tire condition and, in turn, a vibrational signal when the vehicle is operated at an illegal or excessive rate of speed. The invention is also concerned with a low pressure indicator which includes a radially-extending segmented rib formed on interior surface of the sidewall of the tire which, upon unsafe tire deflation, forms a continuous relatively rigid member which produces a vibrational signal during vehicle operation.

Low pressure indicators and signalling devices for tires, which produce an audible, visual or vibrational signal to indicate low pressure, are well known in the art. For example, Siever (U.S. Pat. No. 2,481,166) discloses a tire deflation indicator which produces an audible sound at any desired reduction of air pressure in the tire. The indicator includes a sound-producing, resilient tongue, one end of which is coupled to the tire rim and the free end of which abuts the sidewall of the tire. By means of a set screw which controls the desired degree of tension of the free end of the tongue against the sidewall of the tire, a clicking sound will be produced when the predetermined extent of deflation of the tire is reached. Erickson (U.S. Pat. No. 2,227,074) discloses a somewhat comparable device which produces an audible signal when the tire becomes deflated. The device includes a bowed-out, resilient spring strip which is embedded in a cavity in the sidewall of the tire and which produces an audible "click-clack" when the tire becomes deflated.

Other devices are known which produce a vibrational signal as a result of tire deflation. For example, Arndt (U.S. Pat. No. 1,422,068) employs a spherical ball enclosed in a cavity of the tire which, upon tire deflation, is caught between the sides of the tire, causing a bulge therein, as a result of which when the wheel revolves, a noticeable bump will be produced. In a somewhat similar fashion, Heerwagen (U.S. Pat. No. 1,505,784) employs a strip of flexible material having a hump portion which is placed between the tire and the inner tube or the inner tube and the rim, and which, when the tire becomes partially deflated, causes a noticeable recurring bump during vehicle operation.

While devices of this type are generally satisfactory for the purposes intended, they are generally impractical to use and are, in fact, not commercially acceptable. Moreover, although they do provide a device for indicating tire deflation or underinflation, they do not permit one to determine excessive tread wear. Furthermore, they employ rather complicated constructions and modes of operation.

In addition, speed governing devices are well known, which today are being considered in light of the current Federally imposed 55 mph speed limit which was enacted to conserve fuel. However, these devices have not received industry or consumer acceptance and there is considerable doubt as to how mandatory use of speed governors could be effectively enforced.

Accordingly, it is an object of the present invention to provide a novel low pressure, tread wear and speed indicator for tires, which, upon excessive tread wear and/or tire deflation or an excessive rate of speed, produces a signal perceivable by the driver, indicating excessive vehicle speed or an unsafe tire condition.

It is also an object of this invention to provide such a device which can also be used as an auxiliary traction element during inclement weather.

It is a further object of the invention to provide such a device which is simple in construction, reliable in operation, easily installed, and of economic fabrication.

It is a more particular object of the present invention to provide such a device which produces both a vibrational and audible signal to indicate an unsafe tire condition and a vibrational signal to indicate excessive vehicle speed.

It is also a more particular object of this invention to provide such a device having the foregoing attributes and characteristics, which has the ability to detect excessive braking, cornering, weight or imminent tire failure, as may be caused by tire deflation at high cruising speeds.

Certain of the foregoing and related objects are readily obtained in a low pressure and wear indicator for a tire of the type including an annular crown having treads formed thereon and an inner and outer sidewall joined to the crown at opposite lateral ends thereof, and extending generally radially inwardly therefrom, which includes at least one abutment member secured to the exterior surface of one of the sidewalls adjacent to the treads on the crown. The abutment member projects laterally outwardly from the sidewall at a distance radially inwardly of the treads, such that upon excessive underinflation or tread wear, or a combination thereof, the abutment will strike the road surface to produce a signal indicating an unsafe tire condition.

Preferably, the abutment member includes a generally bulbous, cup-shaped element which is at least partially embedded within the sidewall of the tire. The element may be fabricated from either metal or plastic to produce a highly audible signal. Alternatively, the abutment member may have a generally V-shaped configuration, the apex of which extends radially outwardly from the center of the tire toward the tread. In this latter embodiment, and in a snow emergency, the tire can be partially deflated so that the abutment will contact the ground to increase the effective tire width, as a result of which the abutment member will serve as an additional traction element. A plurality of these abutment elements may be employed over the periphery of the sidewall of the tire, to facilitate this purpose.

While only one lateral abutment member need be employed, it is desirable to use at least two abutment members, which should be located at opposite points on the sidewalls of the tire, opposed 180° circumferentially, to maintain tire balance. Most desirably, at least one of the lateral abutments may also include a weighted insert which, during vehicle operation at a predetermined rate of speed, will cause the tire to assume a relatively eccentric shape, in turn, producing tire vibration.

Alternatively, the weighted insert need not necessarily be implanted within the abutment member but instead could be at least partially embedded within one of the sidewalls of the tire. Most desirably, at least two of the inserts are used which are spaced approximately 180 degrees apart from one another. In another embodiment of the invention, only the weighted insert is employed in conjunction with the tire so that it simply serves as a speed governor.

In an alternate preferred embodiment of the invention, the tire includes a radially extending segmented rib formed on the interior surface of the tire sidewall which in its normal condition, comprises a plurality of rib segments separated by notched edges. However, upon excessive tire underinflation, the rib segments are pushed together to form a continuous relatively rigid member which will produce a recurring vibration signal during vehicle operation.

Other objects and features of the present invention will become apparent from the following detailed description when taken in connection with the accompanying drawings, which disclose several embodiments of the invention. It is to be understood that the drawings are designed for the purposes of illustration only, and are not intended as a definition of the limits and scope of the invention disclosed.

In the drawings, wherein similar reference numerals denote similar elements throughout the several views.

Figure 11:
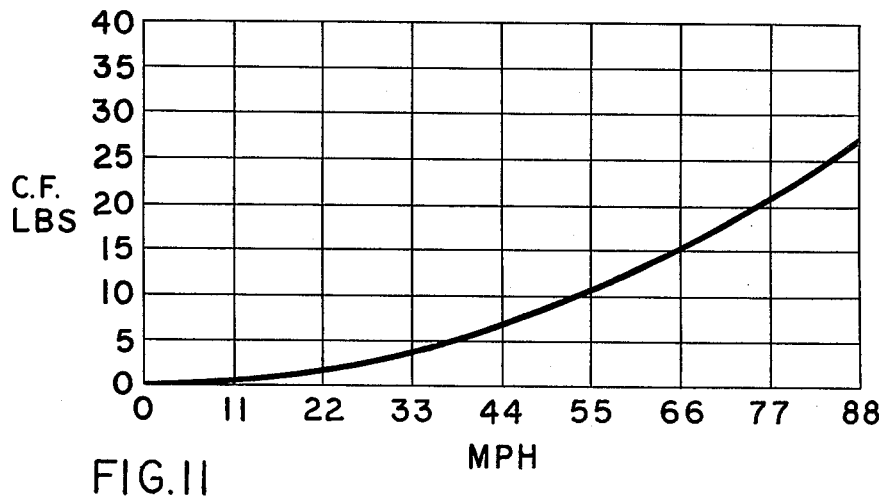
Figure 12:
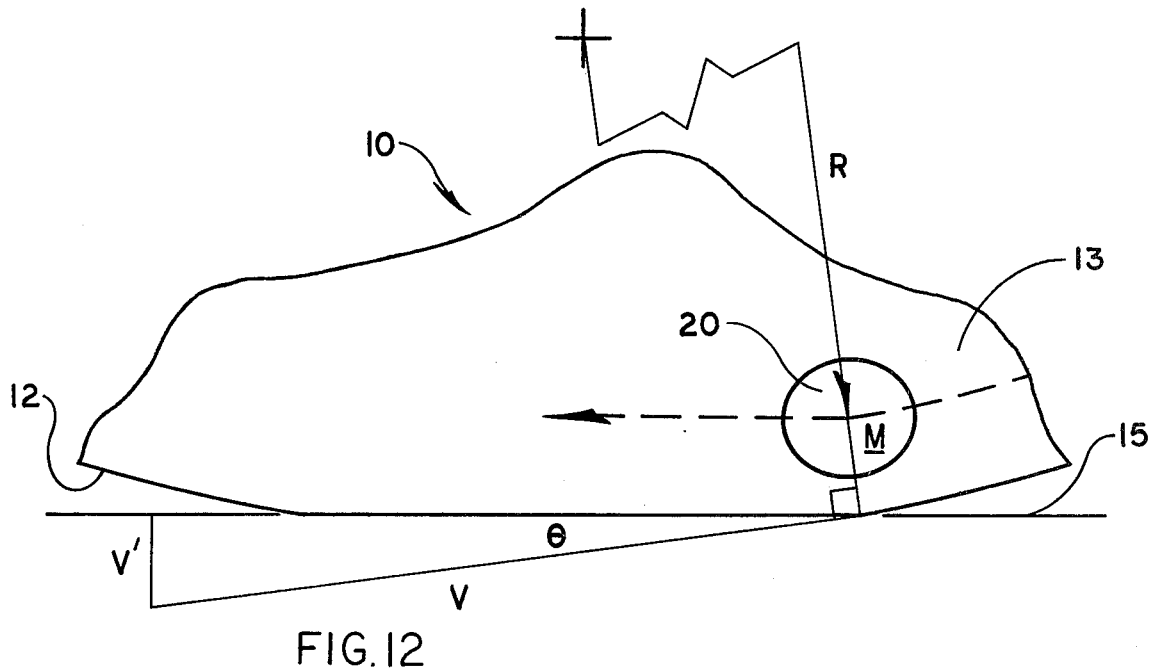

FIG. 11 is a graph which theoretically plots centrifugal force (lbs.) v. vehicle speed (mph) for a 1 oz. weighted insert (static mass) embedded in its sidewall adjacent the tread on a 14 in. radius tire; and FIG. 12 is a diagrammatic representation of a tire having a weighted insert embedded in its sidewall adjacent to its tread, operated at 55 mph (80 ft/sec) which theoretically depicts the vertical impact load of the insert on the road surface.

Figure 1:
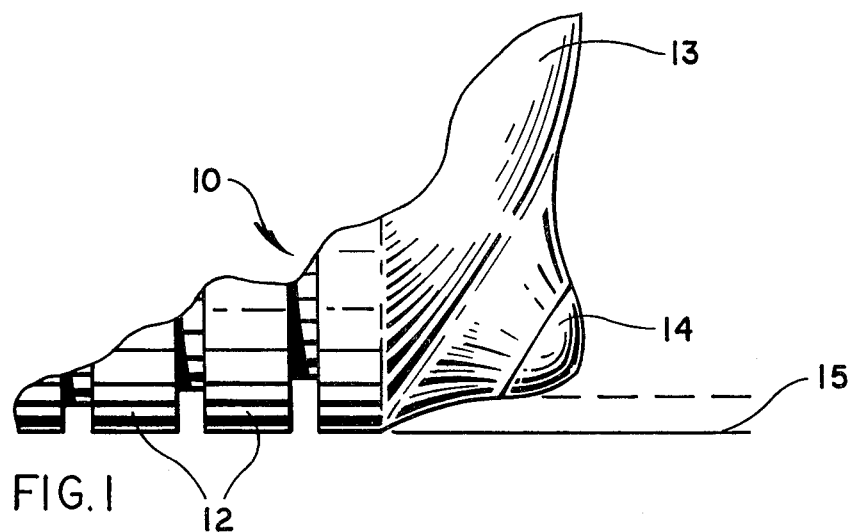
FIG. 1 is a fragmentarily-illustrated, perspective view of a tire in which the novel low pressure, tread wear and speed indicator embodying the present invention, is incorporated and shown in its normal position.
Figure 2:
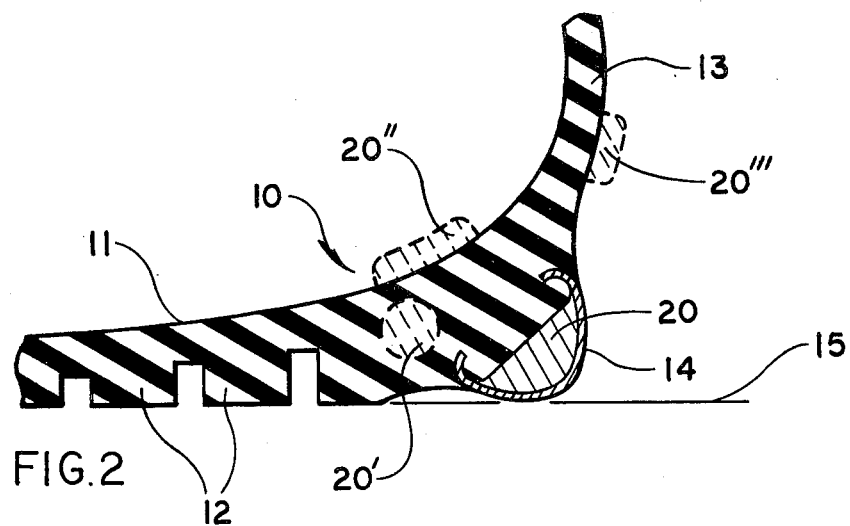
FIG. 2 is a cross-sectional view of the tire shown in FIG. 1, showing the position of the indicator when an unsafe tire condition exists and, showing in phantom line, three alternate positions of the weighted insert.

Turning now in detail to the appended drawings, therein illustrated is a novel low pressure, tread wear and speed indicator for a tire, embodying the present invention. As can be seen in FIGS. 1 and 2, a tire 10 is provided having an annular crown 11 on which are formed a plurality of circumferentially-extending treads 12. Extending generally upwardly and radially inwardly from each lateral end of crown 11 is a sidewall 13 (only one of which is shown).

A generally cup-shaped, bulbous abutment member 14 is embedded in the base of sidewall 13 adjacent to treads 12 and extends generally laterally outwardly therefrom. As shown in FIG. 1, under normal conditions, i.e., when the tire is properly inflated to the desired pressure and there is adequate tread, abutment member 14 is disposed radially inwardly of tread 12 and does not contact the road surface 15 during vehicle operation. However, as seen in FIG. 2, when tire 10 is underinflated and/or there is excessive tread wear, abutment member 14 will strike the road surface 15 during vehicle operation, producing a recurring vibrational and audible thumping signal, which may be readily perceived by the driver; the exact location of lateral abutment member 14 on sidewall 13 will, of course, be selected to suit the pressure requirements and safe tread limits of the tire used.

To enhance the audible signal, the abutment member is preferably fabricated from metal or durable plastic such as phenolic resins. In addition, to maintain proper tire balance, it is desirable to use at least two abutment members located 180° apart on the tire sidewall 13.

Figure 10:
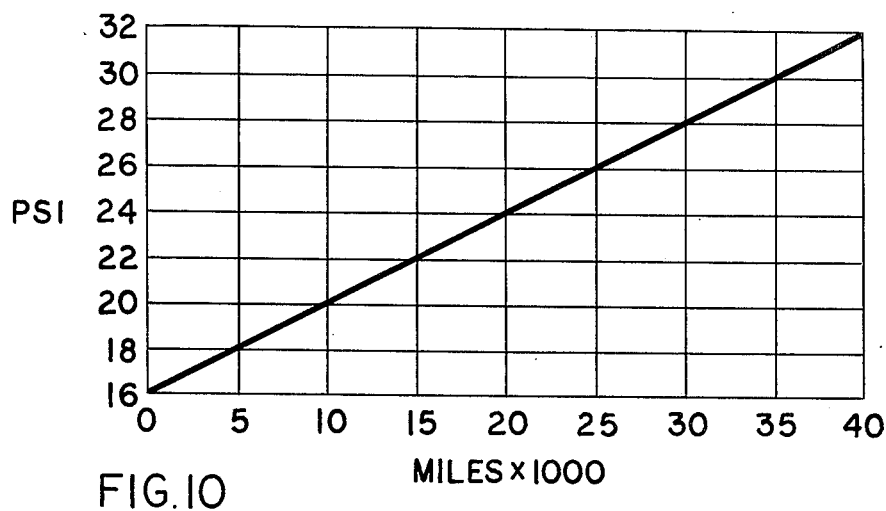
FIG. 10 is a graph which theoretically plots inflation pressure (psi) v. miles of tire use to depict limits of safe usage of the tire relative to tread wear and tire deflation.

As an example, for a tire having a 14 inch radius and a maximum starting tread thickness of ⅜ of an inch and a usable safe tread life of 40,000 miles, an abutment member would be positioned on the sidewall, adjacent the tread such that its lower surface would be approximately 5/16 of an inch from the ground at the normal and proper inflation pressure for this tire (e.g., 32 lb/sq. inch). As can be seen from the graph of FIG. 10, when the tire is new and has the full starting tread, the abutment will not strike the ground until the tire is deflated to 16 lb./sq. in. (the graph line depicting ground contact). However, after using the tire for 20,000 miles (and assuming gradual tread wear) the abutment will strike the ground if the tire deflates to a pressure of 24 lbs./sq. inch. At 40,000 miles, when the tire will typically only have a tread thickness of 1/16 of an inch left, the abutment will strike the ground even at the proper inflation pressure of 32 lbs. sq. inch.

As can be seen from the foregoing example, the abutment member will produce a signal as a result of either unsafe tire deflation or tread wear or a combination of these factors. As previously noted, the position of the abutment may be altered to produce a signal at either higher or lower values of the inflation and tread wear according to the safe pressure and tread limits of the specific particular tire employed.

As can be seen from FIG. 2, lateral abutment 14 may advantageously include a weighted insert 20 such as lead or any other suitable metal or other material, which can be used as a speed governor. During vehicle operation and tire rotation, weighted insert 20, under the influence of a centrifugal force, will cause a radial growth in the elastic tire along the radial sector or segment of the tire in which it is located. This, in turn, will cause the tire to assume a generally eccentric or out-of-round shape which will produce a recurring vibrational "thumping" signal. The degree of eccentricity or tire distortion and the resultant vibrational signal will of course be dependent upon the mass of the insert and the rotational speed of the tire; the eccentricity or radial distortion increasing proportionally relative to an increase in mass and exponentially relative to velocity (i.e., $V^2$). As can be appreciated, for a given mass of the insert, radial growth and tire eccentricity or distortion will exhibit a marked increase at high rates of speed such as above 55 mph. Accordingly, the various parameters (e.g., mass, radial distance from the center of the tire, etc.) for the insert may be selected so that at permissable speeds there is no appreciable amount of tire eccentricity, but that at above the legal speed limits (e.g., 55 mph), there is a significantly greater amount of tire eccentricity which will produce a recurring thumping signal. This will alert the driver that he has exceeded the speed limit and will produce a most annoying and uneven ride if he continues at this illegal speed.

As a specific example, and as illustrated in FIG. 11, if a 1 oz. (static) insert is implanted in the sidewall of the tire adjacent the tread thereof, which tire has a radius of 14 inches (measured from the axle axis to the tread), driving at about 33 mph will produce a centrifugal force of approximately 3.8 lbs., which will have no significant, appreciable effect on tire configuration. However, when driving at 66 mph, which is 11 mph above the national 55 mph speed limit law, a centrifugal force of 15.3 lbs is produced which, in turn, will significantly effect eccentric radial growth of the tire, thus, producing a vibrational and/or audible signal.

The effect of employing a weighted insert as a speed governor is diagrammatically illustrated in FIG. 12. Here again, a tire having a radius R of 14 inches and having a 1 oz. (static) weighted insert 20 embedded in its sidewall adjacent the tread thereof is employed. As can be seen in the diagram, the tire will generally have a somewhat flattened tread surface portion contacting the ground due to normal load considerations. Consequently, when the vehicle is operated at 55 mph (80 ft./sec.), the tangential velocity vector V will have a vertical vector component V' approximately equivalent to 10 ft./sec. (assuming about a 7 degree angle deviation $\theta$ from the horizontal in tire-ground tangential contact, due to normal loading). As a result, and due to the fact that a weighted insert will produce a centrifugal force of about 10.6 lbs. at 55 mph (see FIG. 11), a vertical impact work load having an energy equivalent of approximately 1/5 horsepower will be produced. This will, in turn, produce a noticeable thumping signal readily perceivable by the driver. It should be noted that the angle $\theta$ of tangential contact deviation will increase with underinflation and other tire load factors including aerodynamic download at higher vehicle speed, and therefore the vertical impact load will increase proportionally.

It should be pointed out that the speed sensor (i.e., insert 20) may either be used alone or in combination with the low pressure/low tread wear indicator described above. In addition, it need not necessarily be implanted in lateral abutment 14. For instance, as shown in FIG. 2, an insert 20' could be embedded in the annular crown adjacent to one of the sidewalls 13, or an insert 20'' could be secured to the inner wall of annular crown 12 adjacent to one of the sidewalls 13, or an insert 20''' could be secured to one of the sidewalls 13. It is also desirable to use at least two weighted inserts spaced circumferentially 180 degrees apart in order to maintain proper tire balance. It should be appreciated that new tires are typically not perfectly balanced when fabricated and it therefore may not be necessary to employ more than one insert, since the insert may itself balance the tire.

Figure 3:
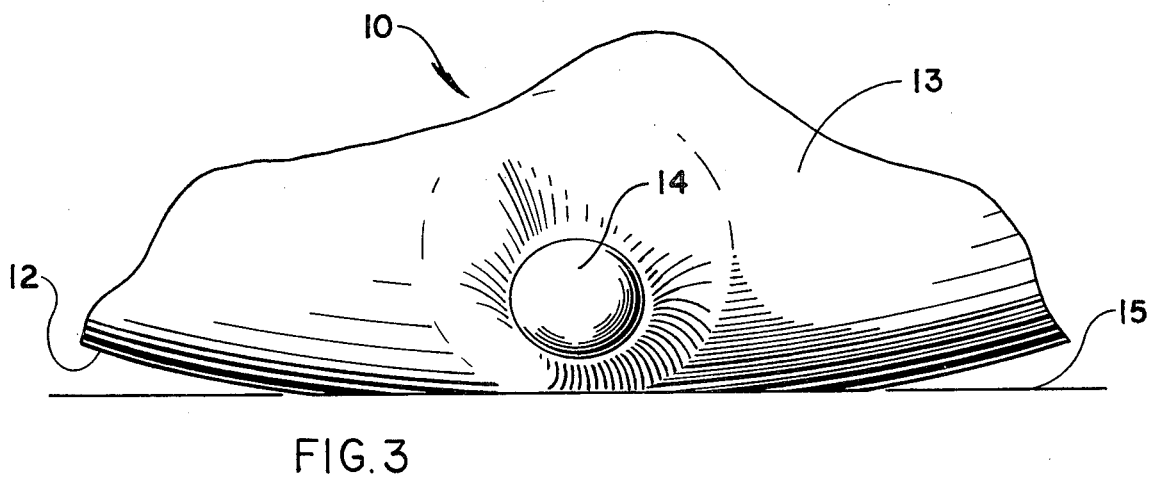
FIG. 3 is a side elevational view of the tire shown in FIG. 1.
Figure 4:
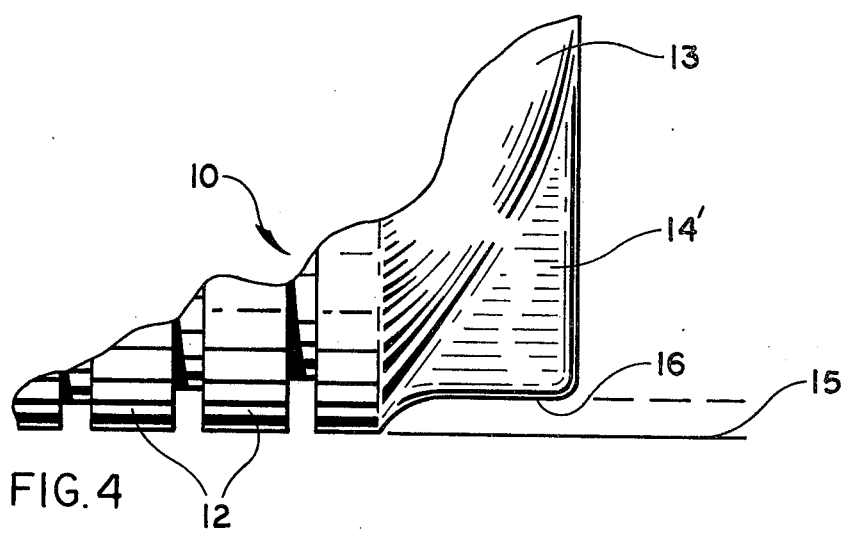
FIG. 4 is a fragmentarily-illustrated, perspective view of another embodiment of the present invention.
Figure 5:
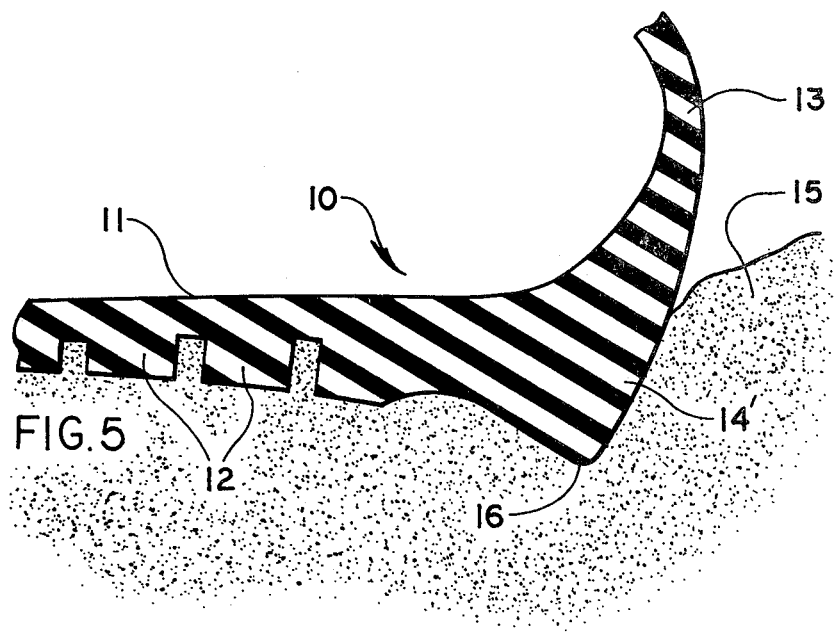
FIG. 5 is a cross-sectional view of the alternate embodiment illustrated in FIG. 4, showing its employment as a traction element on loose sand.
Figure 6:
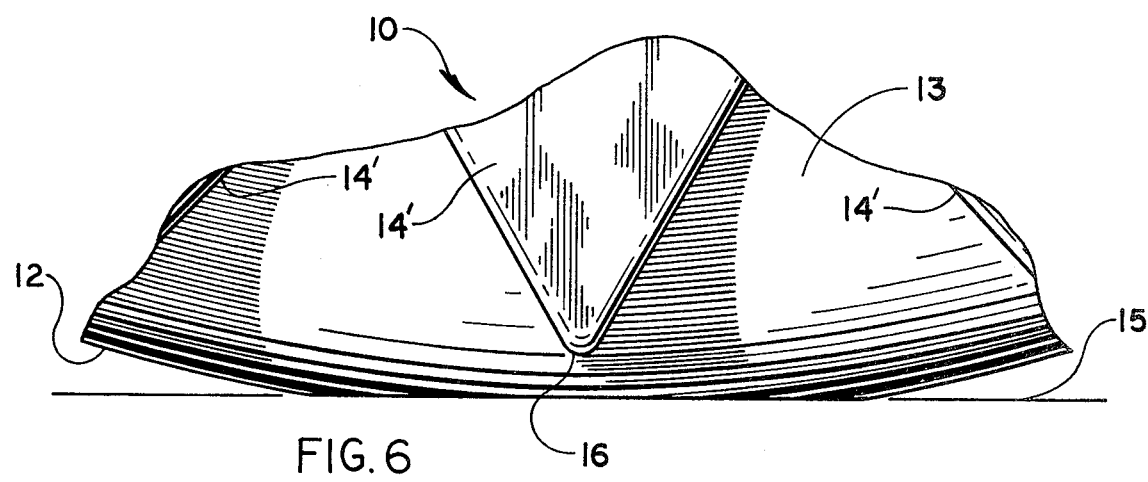
FIG. 6 is a side elevational view of the tire illustrated in FIG. 4.

FIGS. 4 through 6 illustrate an alternate embodiment of the abutment member 14 shown in FIGS. 1 to 3. In this embodiment, a plurality of integrally-formed laterally outwardly-extending abutment members 14', each of which has a generally V-shaped configuration, are spaced equidistantly apart about the base of sidewall 13 of tire 10, adjacent to treads 12 thereof; the abutment members 14' each having an apex 16 directed radially outwardly from the center of tire 10. Abutment members 14' are positioned radially inwardly of treads 12, such that they will normally be disposed above road surface 15 during vehicle operation. However, here too, their position is selected so that upon tire deflation and/or unsafe tread wear, they will strike the ground during vehicle operation, to produce a recurring thumping signal, thus warning the driver of a critical tire condition.

As shown in FIG. 5, during bad weather when the road surface is covered with loose sand, snow or mud, lateral abutments 14' can be used as auxiliary traction elements. The effective traction surface can be increased by simply deflating tire 10 slightly, so that abutments 14' will contact the ground. This will significantly improve traction, due to the increase in tire ground contact, as well as the "spike-type" configuration of abutments 14'. Of course, it should be appreciated that even under normal inflation, these abutments will serve as auxiliary traction elements when travelling through relatively deep snow or mud due to their proximity to treads 12.

Figure 7:
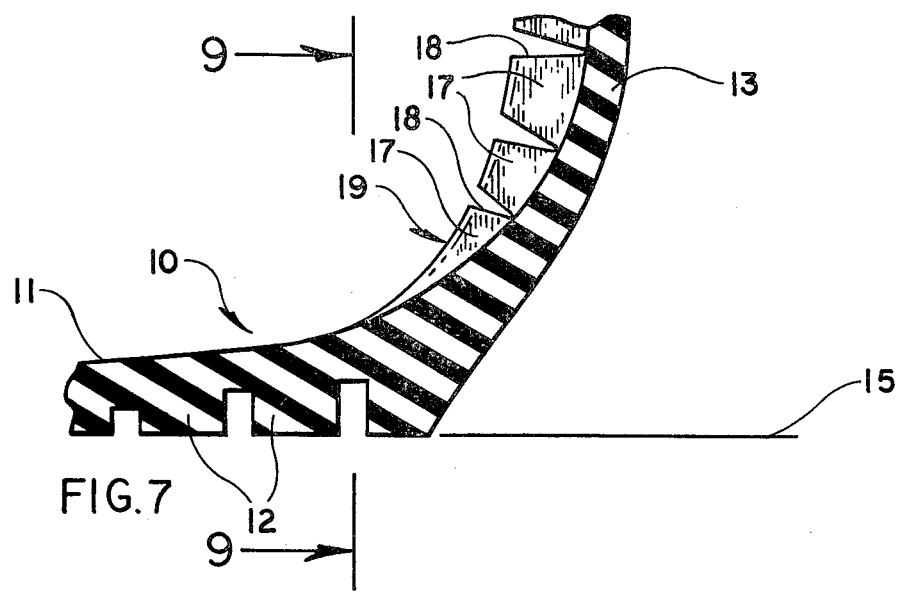
FIG. 7 is a fragmentarily-illustrated, cross sectional view of still another embodiment of the invention, showing the indicator in its normal position.
Figure 8:
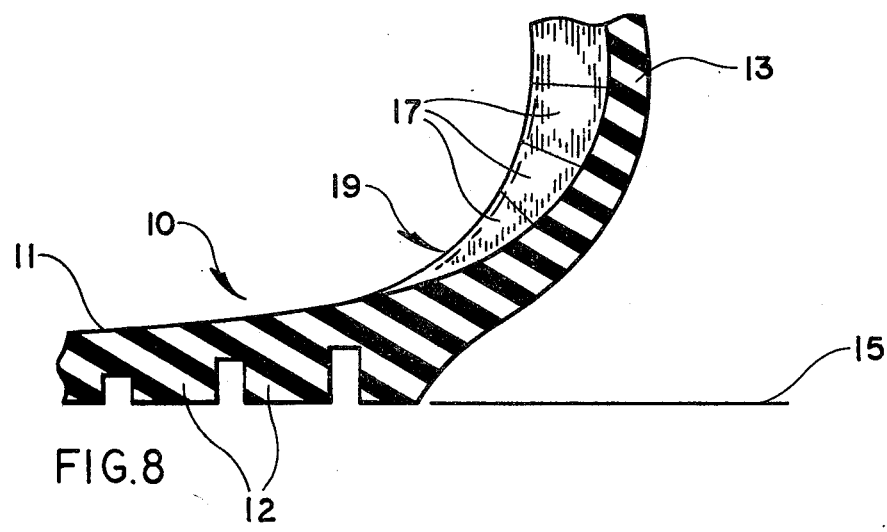
FIG. 8 is a view similar to that of FIG. 7 but showing the position of the indicator when an unsafe tire condition exists.
Figure 9:
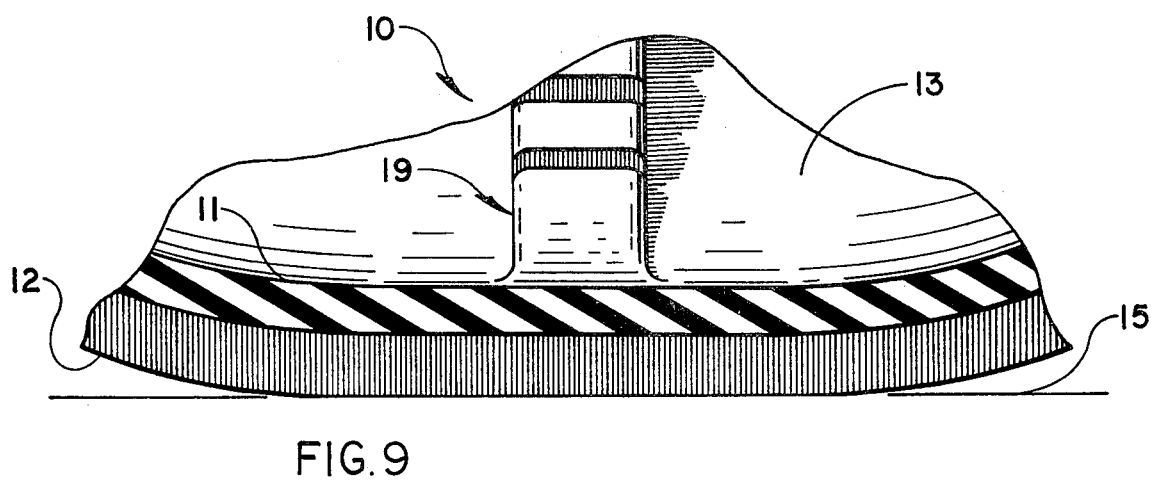
FIG. 9 is a side elevational view, in part section, taken along line 9—9 of FIG. 7.

FIGS. 7-9 illustrate a further embodiment of the invention which can also be used to indicate excessive or unsafe tire deflation. In contrast to the employment of the lateral abutment members 14, 14' employed in the previously described embodiments, in this case a radially-extending generally rectangular, internal segmented rib 19 is provided along the interior surface of sidewall 13. As can be seen in FIGS. 7 and 9, in its normal position (when the tire is properly inflated), the segments 17 of rib 19 are separated by means of the generally V-shaped notches 18 formed in rib 19, which serve to define a generally discontinuous rib which has no appreciable effect on tire operation. However, as shown in FIG. 8, when the tire deflates to a critical level, rib segments 17 are pushed together forming a continuous relatively rigid rib which will produce a vibrational signal during vehicle operation. As can be appreciated, the dimensions of rib segments 17 and notches 18 will be predetermined in relation to the individual inflation characteristics of the tire employed.

While only several embodiments of the present invention have been shown and described, it will be obvious to those persons of ordinary skill in the art that many changes and modifications may be made thereunto, without departing from the spirit and scope of the invention.

What is claimed is:

1. A low pressure and tread wear indicator for a tire including an annular crown having treads formed thereon having a maximum starting thickness, which treads may be worn down upon use to a predefined safe level of minimum tread thickness, and inner and outer sidewalls joined to the crown at opposite ends thereof and extending generally radially inwardly therefrom, comprising:

at least one cup-shaped abutment member having an interior cavity configured and dimensioned to receive a weighted insert and inwardly-directed flange portions which are at least partially embedded within one of said sidewalls, adjacent to said treads on said crown, said abutment member projecting laterally outwardly from said sidewall, at a distance radially inwardly of said treads such that it is disposed radially inwardly of said predefined safe level of minimum tread thickness so that, upon excessive underinflation or tread wear or a combination thereof, said abutment will strike the road surface to produce a signal indicating an unsafe tire condition.

2. The indicator according to claim 1, wherein said abutment member is fabricated from metal to produce a highly audible signal.

3. The indicator according to claim 1, additionally including a weighted insert received within said abutment member.

* * * * *